United States Patent
Hino et al.

(10) Patent No.: US 8,378,551 B2
(45) Date of Patent: Feb. 19, 2013

(54) ACTUATOR AND METHOD OF MANUFACTURING THE SAME

(75) Inventors: Tetsuo Hino, Yamato (JP); Sotomitsu Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 346 days.

(21) Appl. No.: 12/887,225

(22) Filed: Sep. 21, 2010

(65) Prior Publication Data

US 2011/0074253 A1 Mar. 31, 2011

(30) Foreign Application Priority Data

Sep. 25, 2009 (JP) ................... 2009-221105
Aug. 3, 2010 (JP) ................... 2010-174841

(51) Int. Cl.
*H02N 11/00* (2006.01)
*H01S 4/00* (2006.01)

(52) U.S. Cl. ...................... 310/300; 29/592.1
(58) Field of Classification Search ................. 310/300, 310/800; 29/592.1
See application file for complete search history.

(56) References Cited

U.S. PATENT DOCUMENTS

| 4,896,328 A | 1/1990 | Sekiguchi et al. |
| 4,930,132 A | 5/1990 | Shimizu et al. |
| 2007/0104604 A1* | 5/2007 | Masuda et al. ............... 418/55.2 |
| 2007/0184238 A1* | 8/2007 | Hockaday et al. ............... 428/98 |
| 2009/0115286 A1* | 5/2009 | Asaka et al. ................... 310/311 |
| 2011/0156530 A1* | 6/2011 | Yamamoto et al. ........... 310/300 |

FOREIGN PATENT DOCUMENTS

| JP | 2007-118159 A | 5/2007 |
| JP | 2008-079462 A | 4/2008 |
| JP | 2008-211885 A | 9/2008 |

* cited by examiner

*Primary Examiner* — Thomas Dougherty
(74) *Attorney, Agent, or Firm* — Fitzpatrick, Cella, Harper & Scinto (57) ABSTRACT

Provided is an actuator which has high degree of integration and can reduce a difference of the developed force depending on a direction of displacement, and obtain a substantially uniform developed force over all directions. The actuator including a laminate which includes: a pair of electrode layers; an ion-conducting layer that is held between the pair of electrode layers; and an insulating layer that is disposed on one of the pair of electrode layers, in which the laminate forms a multilayer structure that is spirally wound around a conductive shaft, and multiple notches are formed in at least a partial region of the multilayer structure.

10 Claims, 6 Drawing Sheets

ACTUATOR AND METHOD OF MANUFACTURING THE SAME

BACKGROUND OF THE INVENTION

1. Field of the Invention

The present invention relates to an actuator using an ion-conducting material and a method of manufacturing the actuator.

2. Description of the Related Art

In recent years, attention is attracted to ion-conducting actuators using an organic material or a carbon material because the ion-conducting actuators are high in flexibility, relatively light in weight, and usable in air. They are also called "actuators", and as a typical actuator, an ionic polymer-metal composite (IPMC) actuator that is made up of an ion-exchange membrane made of a perfluorosulfonic acid-based resin and a junction electrode is known. A CNT gel actuator is also known. The CNT gel actuator has a structure in which a gel (CNT gel) obtained by combining carbon nanotubes (CNTs) with an ionic liquid which is an ion-conducting liquid is used for elastic electrode layers (electrodes), and an electrolyte layer impregnated with an ionic liquid is held between those electrodes.

In those actuators, when a voltage increases for the purpose of increasing a developed force, a polymer membrane and the ionic liquid are subjected to electrolyzation. Therefore, the integration of the actuators is effective in increasing the output. As a general actuator integrating method, there is a method in which multiple actuators are prepared, and integrated in order. However, integration work is complicated. Further, because the actuators manufactured in this manner is in a state where the respective electrodes are separate from each other, wiring work to the respective electrodes is complicated. Further, the amount of wiring is large, and the structure of the actuators is complicated. Further, an actuator in which the IPMC actuator and a sheet formed with a thin film transistor (TFT) element are attached to each other in an integrated arrangement. Similarly, in this case, the wiring is complicated, and the manufacturing costs may be high.

On the other hand, Japanese Patent Application Laid-Open No. 2008-079462 proposes an actuator in which a single membrane of the actuator which is cut into multiple elongated regions along a bending direction is knitted in a state where the multiple elongated regions are maintained in the bending direction for integration.

However, the drive of the ion-conducting actuators such as the IPMC actuator and the CNT gel actuator derives from the migration of ions within the actuator based on the application of an electric field. For that reason, in Japanese Patent Application Laid-Open No. 2008-079462, even though the developed force can be improved by the relatively simple integration, the motion of the actuator becomes a flexion movement based on a fact that the expansion and contraction of the different electrodes are naturally induced. For that reason, there arises such a problem that the developed force is different according to the directions of displacement, and a substantially uniform developed force cannot be obtained over all directions.

SUMMARY OF THE INVENTION

An object of the present invention is to provide an actuator having the following features in order to solve the above-mentioned problems in improving the developed force of the actuator using an ion-conducting material. That is, the present invention aims at providing an actuator which has high degree of integration and can reduce a difference of the developed force depending on the direction of displacement, and obtain the substantially uniform developed force over all directions.

Further, the present invention aims at providing a method of manufacturing the actuator which can simply and easily obtain the above-mentioned actuator.

In order to solve the above-mentioned problem, there is provided an actuator including a laminate, the laminate including: a pair of electrode layers; an ion-conducting layer that is held between the pair of electrode layers; and an insulating layer that is disposed on one of the pair of electrode layers, in which the laminate forms a multilayer structure that is spirally wound around a conductive shaft, and multiple notches are formed in at least a partial region of the multilayer structure.

In order to solve the above-mentioned problem, there is also provided a method of manufacturing an actuator, including: preparing a laminate including a pair of electrode layers, an ion-conducting layer that is held between the pair of electrode layers, and an insulating layer that is disposed on one of the pair of electrode layers; forming multiple notches in a partial region of the laminate; and spirally winding the laminate around a conductive shaft so that a direction of the multiple notches is parallel to an axial direction of the conductive shaft to form a multilayer structure.

According to the present invention, there can be provided the actuator which has high degree of integration and can reduce a difference of the developed force depending on the direction of displacement, and obtain the substantially uniform developed force over all directions.

Further, according to the present invention, there can be provided the method of manufacturing the actuator which can simply and easily obtain the above-mentioned actuator.

Further features of the present invention will become apparent from the following description of exemplary embodiments with reference to the attached drawings.

DESCRIPTION OF THE EMBODIMENT

Hereinafter, an embodiment of the present invention is described in detail.

According to the present invention, an actuator including a laminate which includes: a pair of electrode layers, an ion-conducting layer that is held between the pair of electrode layers, and an insulating layer that is disposed on one of the pair of electrode layers, in which the laminate forms a multilayer structure that is spirally wound around a conductive shaft, and multiple notches are formed in at least a partial region of the multilayer structure.

Figure 1:
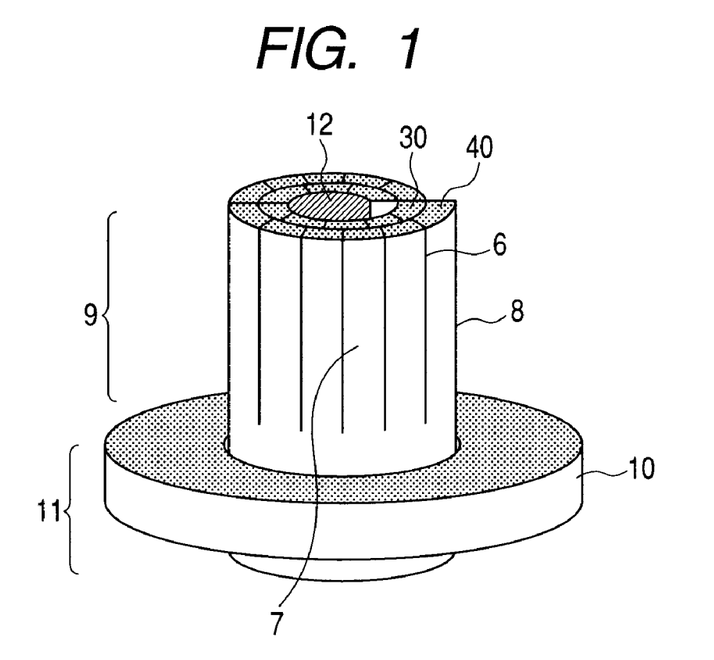
FIG. 1 is a perspective view illustrating an actuator according to an embodiment of the present invention.
Figure 2:
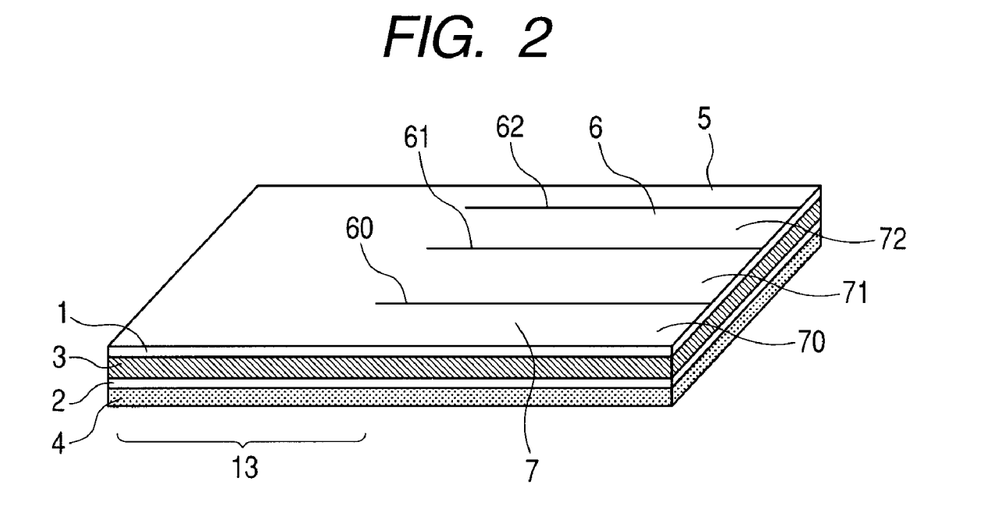
FIG. 2 is a perspective view illustrating a laminate that constitutes the actuator according the embodiment of the present invention.

FIG. 1 is a perspective view illustrating an actuator according to an embodiment of the present invention. FIG. 2 is a perspective view illustrating a laminate that constitutes the actuator according the embodiment of the present invention. The laminate that constitutes the actuator according to the present invention includes, for example, as illustrated in FIG. 2, a laminate 5 that is made up of a pair of electrode layers 1 and 2, an ion-conducting layer 3 held between the pair of electrode layers 1 and 2, and an insulating layer 4 disposed on one electrode layer 2 of the pair of electrode layers 1 and 2. Multiple notches 6 that reach a bottom surface from a front surface of the laminate 5 are formed in a partial region of the laminate 5.

As illustrated in FIG. 1, the actuator according to the present invention is of a structure in which the laminate 5 is spirally wound around a conductive shaft 12, and a multilayer structure 8 is formed of the wound laminate 5. In the structure, the multiple notches 6 of the laminate 5 are formed in at least a partial region 9 of the multilayer structure 8. A fixing portion 10 is disposed in a region 11 where the multiple notches 6 of the multilayer structure 8 are not formed.

The pair of electrode layers 1 and 2 of the laminate 5 which forms the multilayer structure 8 are arranged so that the other electrode layer 1, on which no insulating layer 4 is disposed, is wound in contact with the conductive shaft 12.

In the actuator, the laminate 5 with the notches is spiraled into the multilayer structure 8, to thereby enable a developed force of the actuator to be improved and simply and easily obtain the actuator high in integration degree. Further, the actuator capable of reducing a difference of the developed force depending on the direction of displacement and obtaining the substantially uniform developed force over all directions can be obtained.

Further, the actuator according to the present invention is used in a case where a heavy load is always applied in a use mode, and in a case where operation against the load is required. Further, the actuator according to the present invention is usable in a movable element that requires a more useful and high developed stress, and can enlarge a range of application.

Figure 8A:
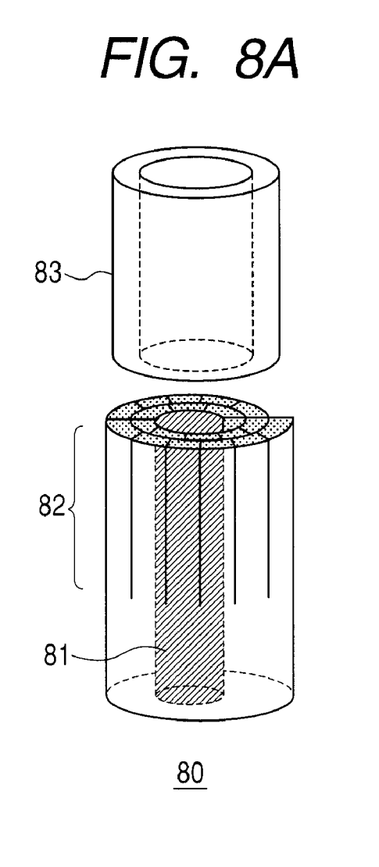
FIGS. 8A, 8B, and 8C are schematic views illustrating examples of actuators different in a length of a conductive shaft and objects to be driven according to the present invention.
Figure 8B:
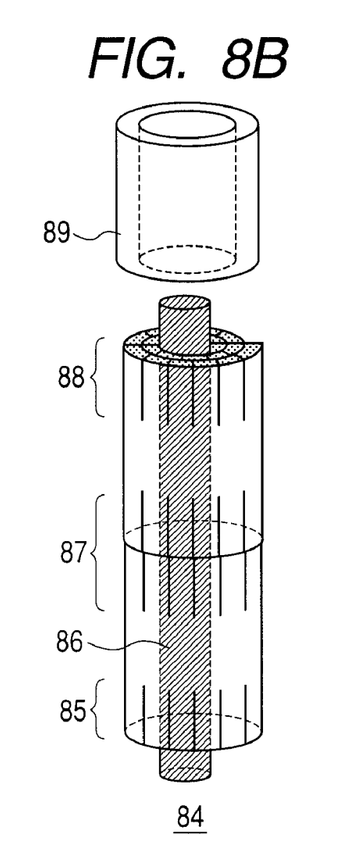
Figure 8C:
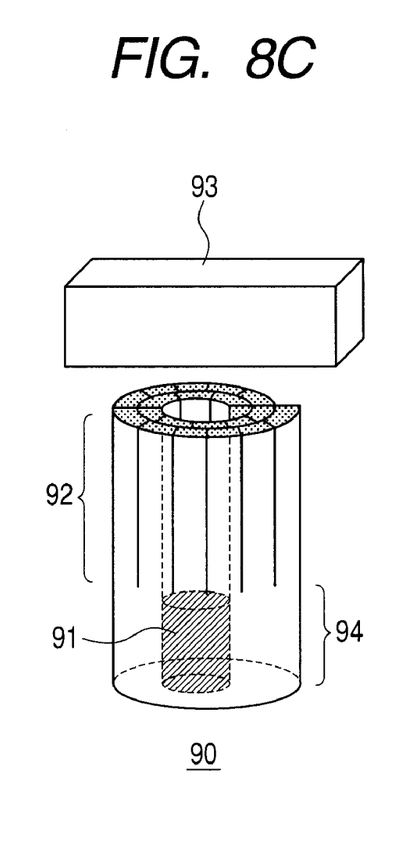

Further, a length of the above-mentioned conductive shaft and a region in which the conductive shaft exists are appropriately adjusted so that objects of various shapes can be driven. FIGS. 8A to 8C are diagrams illustrating examples of the actuators different in the length of the conductive shaft and objects to be driven which are suitable for the respective actuators. In FIGS. 8A to 8C, electrode wiring and a fixing unit for the actuator are omitted. The conductive shaft inside the actuator is also illustrated.

For example, when a conductive shaft 81 reaches a notch region portion 82 as in an actuator 80 illustrated in FIG. 8A, the actuator is suitable for the drive of a cylindrical object 83 having a hollow inner diameter larger than a diameter of the conductive shaft, and a recessed object. Because the conductive shaft 81 of the actuator 80 also serves as a guide of the cylindrical object 83 when driving, smooth driving can be performed.

As in an actuator 84 illustrated in FIG. 8B, when a conductive shaft 86 is longer than the laminate, a cylindrical object 89 can be more stably moved, and a resistance property to horizontal oscillation is also improved.

On the other hand, as in an actuator 90 illustrated in FIG. 8C, when a conductive shaft 91 does not reach a notch region portion 92, the conductive shaft 91 does not interrupt the vertical drive. Therefore, the cylindrical object and the recessed object as well as various objects such as a rectangular solid material can be driven vertically.

Further, the actuator according to the present invention may also be configured as follows.

At least a part of the laminate is bound by a binding band having an electric conductivity.

At least a part of the circumferential portion of the laminate has an exposed portion of the other electrode layer, on which no insulating layer is formed.

At least a part of the exposed portion of the electrode layer is electrically connected to the binding band having the electric conductivity.

The binding band may be used not only as (1) a fixing unit, but also as (2) an electrode (terminal electrode) of the laminated actuator of the present invention. Therefore, the following effects can be expected, and as a result, it is possible to easily manufacture an actuator that simply allows appropriate control of the amount of bending displacement and the developed force.

Figure 9A:
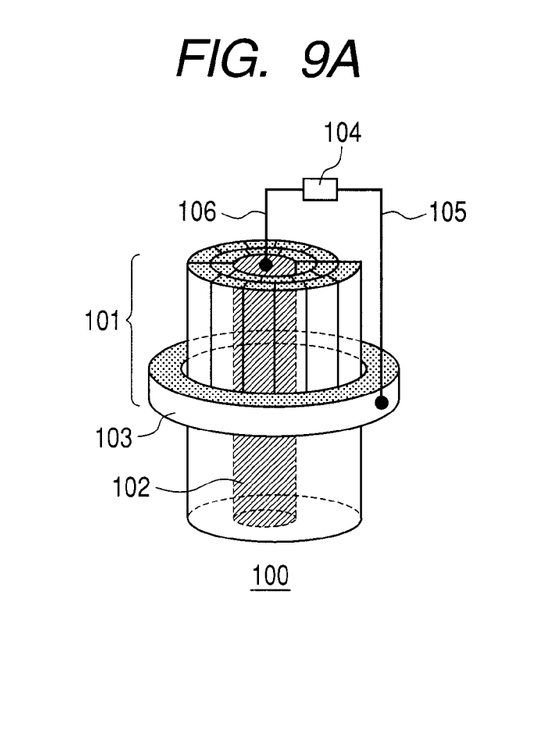
FIGS. 9A, 9B, and 9C are schematic views illustrating examples of actuators bound by a binding band having an electric conductivity according to the present invention.
Figure 9B:
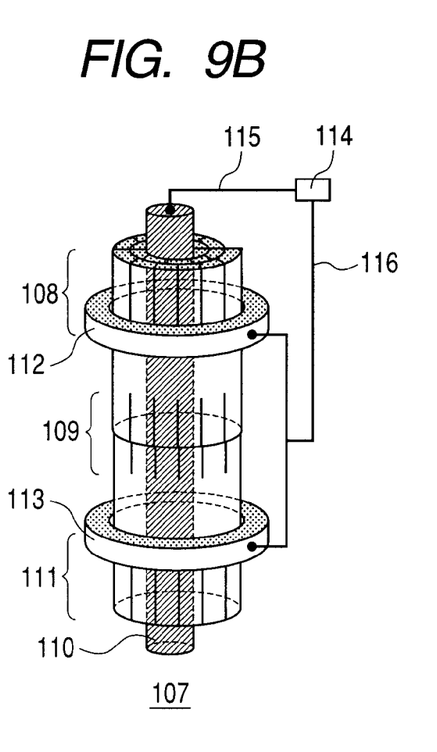
Figure 9C:
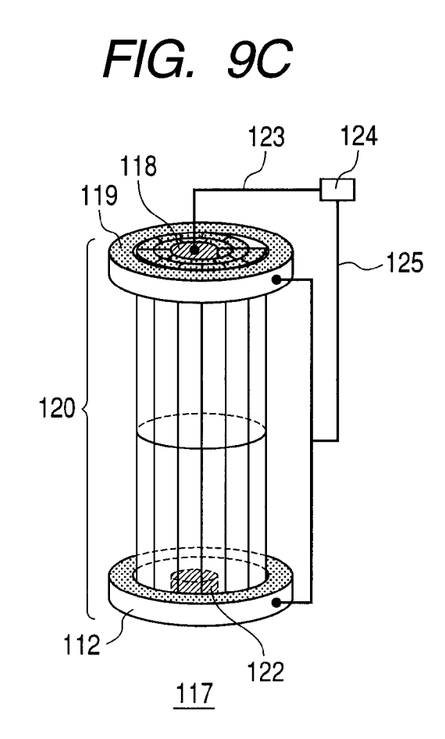

That is, from the viewpoint of (1) the fixing unit, the following effects can be expected: without using a separate fixing unit, the shape of the actuator of the present invention may be retained (for example, FIG. 9A); further, binding the laminate by the binding band may suppress spreading of the actuator in the direction perpendicular to the conductive shaft, to thereby appropriately control the amount of bending displacement and the developed force (the developed force of the bending actuator is inversely proportional to the drive length of the actuator (in this case, the length of the strip portion)) by the placement location of the binding band; and even in the case of an actuator with the notches extending from one end to the other of the electrode layers, the use of the binding band having the electric conductivity allows the electrode layers to be bound and fixed (for example, FIG. 9C).

Further, from the viewpoint of (2) the electrode (terminal electrode), the following effect can be expected: wiring connection can be made easily from the external power supply (power supply) to the electrode layer (outer electrode layer) on the outside instead of the electrode layer (inner electrode layer) that is in contact with the conductive shaft of the actuator of the present invention, with the result that the actuator of the present invention can be manufactured more easily.

Next, a method of manufacturing the actuator according to the present invention is described. FIGS. 3A to 3D are diagrams illustrating a method of manufacturing the actuator according to an embodiment of the present invention.

Figure 3A:
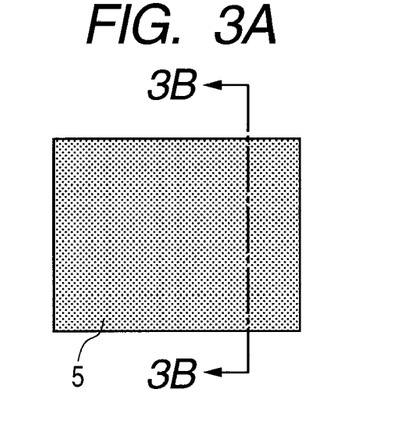
FIGS. 3A, 3B, 3C and 3D are perspective views illustrating a method of manufacturing the actuator according to the embodiment of the present invention.
Figure 3B:
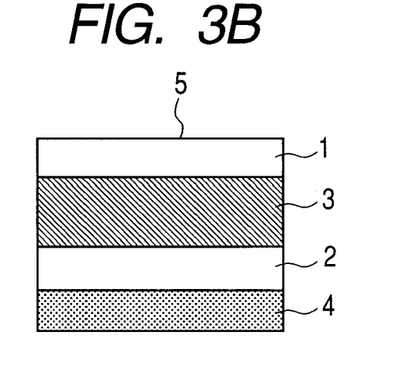

In the method of manufacturing the actuator according to the present invention, for example, the laminate 5 including the pair of electrode layers 1 and 2, the ion-conducting layer 3 that is held between the pair of electrode layers 1 and 2, and the insulating layer 4 that is disposed on one electrode layer 2 of the pair of electrode layers 1 and 2 are prepared. The laminate 5 can be bent (see FIGS. 3A and 3B). FIG. 3A is a plan view of the laminate 5 viewed from a side of the insulating layer 4, and FIG. 3B is a cross-sectional view taken along the line 3B-3B of FIG. 3A.

Figure 3C:
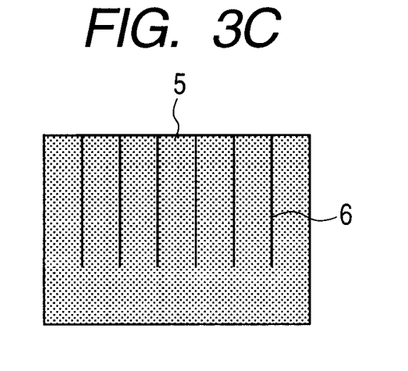
Figure 3D:
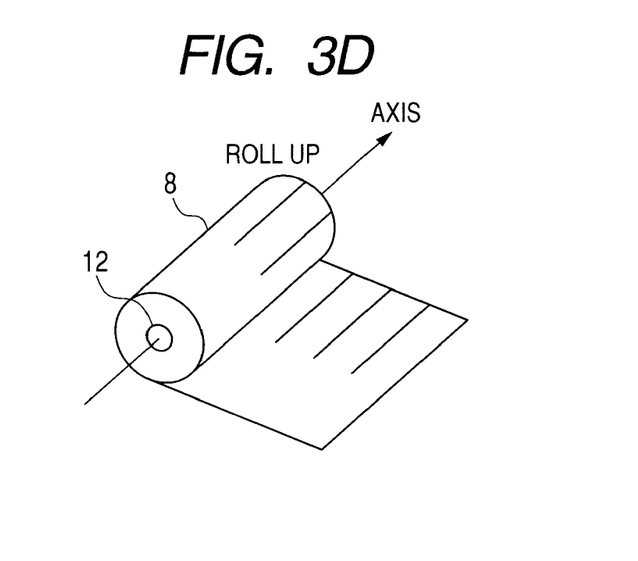

Then, the multiple notches 6 are formed in a partial region of the laminate 5 (see FIG. 3C). Then, the laminate 5 formed with the notches 6 is spirally wound around the conductive shaft 12. In this case, the other electrode layer 1 of the pair of electrode layers 1 and 2, on which no insulating layer 4 is formed, contacts the conductive shaft 12, and a direction of the notches 6 is parallel to the axial direction of the conductive shaft 12 to form the multilayer structure 8 (see FIG. 3D), to thereby obtain the actuator.

Further, in the actuator according to the present invention, the direction of the notches formed by notching the laminate is not perpendicular to the axial direction of the conductive shaft.

(As to Notches)

In the present invention, it is preferred that the multiple notches be formed and that the direction of the notches be parallel to the axial direction of the conductive shaft. In the present invention, the direction of the notches is parallel to the axial direction of the conductive shaft, to thereby enable the uniform force to be generated. For that reason, a difference of the developed force depending on the direction of displacement can be further reduced, and the substantially uniform developed force can be obtained over all directions.

The intervals of the notches in the actuator membrane are not particularly limited as long as the intervals are set so that at least one notch is formed per turn of the spiral windings. The intervals can be set depending on the intended purpose of the actuator as needed. The response speed of the actuator has a tendency to increase more as the intervals of the notches are shorter. At the same time, the developed force has a tendency to decrease more. As a result, it is preferred that the notch intervals be 1 mm or more in order to effectively obtain the substantive developed force.

The notches can be easily formed by scissors, a cutter knife, or laser. The lengths of the notches are not particularly limited. It is preferred that the lengths of the notches be about 40 to 80% of the overall length in the height direction of a spirally wound cylinder. However, the lengths are not particularly limited to this range.

It is further preferred that the lengths of the multiple notches be identical with each other and that the intervals of the multiple notches be identical with each other. This is because the lamination efficiency and the integration efficiency are further enhanced, and the drive of the actuator has a tendency to be uniform.

In the actuator, when the lengths of the notches and intervals of the notches are identical with each other, the lamination efficiency and the integration efficiency are further enhanced. Further, because the drive of the actuator becomes uniform, the larger developed force can be obtained.

(As to Spiral Windings)

The number of turns, how to wind, and a winding angle of spiral windings of the actuator can be appropriately selected from one or more arbitrary turns, taking characteristics such as rigidity, a displacement force, and the amount of displacement required for a desired actuator into consideration. The laminate does not always need to be wound on the same plane, but may be wound conically or cylindrically. How to wind is not limited. The spirally wound configuration is not also particularly limited, but may be a circular configuration, a rectangular configuration, a polygonal configuration, or the combination thereof as well as a polygonal line or the combination of a straight line and an arc.

In the method of manufacturing the spirally wound actuator according to the present invention, a known spirally wound film fabricating method can be appropriately used. For example, the spirally wound state may be maintained by the aid of a fixing equipment (fixing portion) for the purpose of retaining the shape, or the laminated portion may be adhered with an adhesive.

(As to Conductive Shaft)

The conductive shaft is a shaft used when the laminate is spirally wound to form the multilayer structure. When the laminate is spirally wound on the conductive shaft, the other electrode layer, on which no insulating layer of the laminate is disposed, is wound in contact with the conductive shaft. Further, when the one electrode layer, on which the insulating layer of the laminate is disposed, is wound in contact with the conductive shaft, at least a part of the insulating layer that is in contact with the conductive shaft on the inside of the laminate is removed to form a portion in which the electrode layer is exposed to be electrically connected to the conductive shaft.

As described above, the optimum length of the conductive shaft can be appropriately selected according to an object to be driven. For example, as illustrated in FIG. 8C, a cut end of the laminate, which is cut off by a plane including a cross section closest to the notches among cross sections of the conductive shaft 91 that are perpendicular to the axial direction of the conductive shaft 91, does not cross the notches. This configuration is preferred because the conductive shaft 91 does not interrupt the vertical drive of the vertically driven object.

The shape of the conductive shaft is not particularly limited. For example, the sectional shape of the conductive shaft may be circular, oval, rectangular, polygonal, and semicircular. The material of the conductive shaft may include not only a metal but also a material including at least an electronically conductive material such as carbon or conducting polymer.

(As to Binding Band Having Electric Conductivity)

The binding band having the electric conductivity used in the present invention is not particularly limited as long as it has good electric conductivity and does not damage the actuator of the present invention, and may include a conventionally-known conductive fabric, conductive band, or wire mesh. The wire mesh is not particularly limited as long as the material provides good electric conductivity and sufficient elasticity and is easy to process, and may include a stainless wire, tinned copper wire, copper weld wire (tinned, copper, steel), Monel wire (copper and nickel alloy), or aluminum wire. In addition, an elastomer filled wire mesh may be used. The elastomer may be a silicone rubber, or conductive elastomer obtained by dispersing conductive particles in the silicone rubber. The conductive particles may include, for example, fine powders, foils, or fibers of carbon-based materials such as carbon black, carbon fiber, and graphite, as well as materials such as silver, copper, aluminum, chromium, titanium, tungsten, cobalt, zinc, nichrome, an alloy thereof, or metal coated glass. Further, the binding band having the electric conductivity may be formed of a knit obtained by knitting yarns around which a metal foil is spirally wound, or a sheet material obtained by laminating a film material made of a synthetic resin such as polyvinyl chloride with a metal foil. In addition, a plurality of the above-mentioned materials may be used in combination.

Further, it is preferred that the binding band have a sliding property following the drive of the actuator. With the sliding property, even when the drive of the actuator is large, the binding band does not constrain the drive of the actuator.

It should be understood that the binding band may bind the entire actuator, or parts of the actuator may be bound by a plurality of the binding bands, and an optimal configuration may be appropriately selected for a desired actuator.

(Construction Material of Actuator)

Members constituting the actuator of the present invention are described.

Hereinafter, typical materials of the ion-conducting layer, the electrode layers, and the insulating layer which constitute the actuator according to the present invention are described.

(Ion-Conducting Layer)

The ion-conducting layer is made of a flexible material including an ion-conducting material, and may be a nonionic polymer compound including the ion-conducting material, or an ion-conducting polymer compound. The ion-conducting polymer compound means a polymer compound in which carriers of electric charges are ions when the electric charges migrate under an electric field and a current flows. The ion-conducting polymer compound is synonymous with an ionic polymer compound.

Examples of the nonionic polymer compound include: fluorine-containing polymers such as tetrafluoroethylene and polyvinylidene fluoride; polyolefin-based polymers such as polyethylene and polypropylene; polybutadiene-based compounds; polyurethane-based compounds such as an elastomer and a gel; silicone-based compounds; thermoplastic polystyrene; polyvinyl chloride; and polyethylene terephthalate. It should be noted that any one of those compounds may be used alone, or a plurality of the compounds may be used in combination. In addition, those compounds may be functionalized, or may be copolymerized with another polymer. The above-mentioned nonionic polymer compound must include an ionic substance. This allows the bending deformation of an actuator formed of the above-mentioned nonionic polymer compound with the application of a voltage.

Examples of the above-mentioned ionic substance include lithium fluoride, lithium bromide, sodium bromide, magnesium chloride, copper sulfate, sodium acetate, sodium oleate, and sodium acetate. In addition, the substance may be an ionic liquid. It should be noted that when the ionic liquid is used, particularly suitably used as the above-mentioned polymer binder is a polyvinylidene fluoride-hexafluoropropylene copolymer (PVDF (HFP)), polyvinylidene fluoride (PVDF), perfluorosulfonic acid (Nafion), 2-hydroxyethyl methacrylate (HEMA), polymethyl methacrylate (PMMA), polyethylene oxide (PEO), or polyacrylonitrile (PAN).

The mass ratio A/B of an ionic liquid/ionic material (A) to a nonionic polymer compound component (B) in the ion-conducting layer used in the present invention is not particularly limited. However, from the viewpoint of the ion conductivity and the mechanical strength of the ion-conducting layer, A:B=about 0.1:1 to 10:1 is preferred. It is further preferred that the ionic liquid be 30 wt % or more to 80 wt % or less. When the content is lower than 30 wt %, an ionic material may not be sufficiently supplied to the electrode layers when a voltage is applied. When the content is higher than 80 wt %, the mechanical strength becomes low as the electrolyte layer. When the ion-conducting layer is bent and deformed as the actuator, sufficient acting force may not be obtained.

The ionic liquid used in the present invention is also called "room temperature molten salt" or simply "molten salt". The ionic liquid is a salt that is in a molten state in a wide temperature range including normal temperature (room temperature). The ionic liquid is a salt that is in the molten state at, for example, 0° C., preferably −20° C., more preferably −40° C. It is preferred that the ionic liquid used in the present invention have high ion conductivity.

In the present invention, the ionic liquid is not particularly limited, and various known an ionic liquid can be used. However, a stable an ionic liquid that is in the liquid state at normal temperature (room temperature) or temperature close to the normal temperature is preferred. Examples of the suitable an ionic liquid used in the present invention include an imidazolium salt, a pyridinium salt, an ammonium salt, and a phosphonium salt. The ionic liquid may be a combination of two or more an ionic liquids.

The above-mentioned ionic liquid is more specifically exemplified by a liquid formed of a cation (preferably an imidazolium ion) and an anion (X$^-$) represented by the following general formulae (1) to (4).

(1)

(2)

[NRxH4–X]+ (3)

[PRxH4–X]+ (4)

In the above-mentioned formulae (1) to (4), R represents an alkyl group having 1 to 12 carbon atoms, or an alkyl group including an ether bond and having a total of 3 to 12 carbon and oxygen atoms. In the formula (1), R1 represents an alkyl group having 1 to 4 carbon atoms or a hydrogen atom. In the formula (1), it is preferred that R and R1 be not identical with each other. In the formulae (3) and (4), x represents an integer of 1 to 4.

The anion (X$^-$) is preferably at least one kind selected from a tetrafluoroboric acid anion, a hexafluorophosphoric acid anion, a bis(trifluoromethanesulfonyl)imidic acid anion, a perchloric acid anion, a tris(trifluoromethanesulfonyl)carbon acid anion, a trifluoromethanesulfonic acid anion, a dicyanamide anion, a trifluoroacetic acid anion, an organic carboxylic acid anion, and a halogen ion.

As the above-mentioned ion-conducting polymer compound, a polycation may be used, or a polyanion may be used. Examples of the polyanion include, but are not particularly limited to: known polymers each having a basic skeleton such as polyethylene, polystyrene, polyimide, or any of polyarylenes (aromatic polymers), in which an anionic functional group such as a sulfonic acid group (—SO$_3$H), a carboxyl group (—COOH), or a phosphoric acid group has been introduced; and a perfluorosulfonic acid polymer, a perfluorocarboxylic acid polymer, and a perfluorophosphoric acid polymer each having a fluorine-containing polymer skeleton, in which an anionic functional group such as a sulfonic acid group, a carboxyl group, or a phosphoric acid group has been introduced. Of those, a polyfluorosulfonic acid/polytetrafluoroethylene (PTFE) copolymer can be more suitably used as the above-mentioned polyanion. It should be noted that a commercially available product may be used as the polyfluorosulfonic acid/PTFE copolymer and, for example, Flemion™ (ASAHI GLASS CO., LTD.) or Nafion™ (manufactured by DuPont) can be suitably used. In addition, examples of the polycation include, but are not particularly limited to: known polymers such as polyethylene, polystyrene, polyimide, and polyarylenes (aromatic polymers), in which a cationic functional group such as a sulfonium group, an ammonium group, a pyridinium group, or the like has been introduced.

The above-mentioned ion-conducting polymer compound needs to be in a moisture state at a time when the ion-conducting polymer compound is bent and deformed by application of a voltage. As a method of allowing water to be contained in the ion-conducting polymer compound, for example, the ion-conducting polymer compound may be impregnated with water, preferably ion-exchange water. Likewise, when the ionic liquid is used, the ion-conducting polymer compound needs to include an ionic liquid in addition to water or instead of water. When the ion-conducting polymer compound is a polyanion, it is further preferred that a counter cation of an anionic functional group be exchanged to $Li^+$, $Na^+$, $K^+$, or an alkylammonium ion. When the ion-conducting polymer compound is a polycation, it is further preferred that the counter anion of a cationic functional group be exchanged to $F^-$, $Cl^-$, $Br^-$, an aromatic or aliphatic sulfate, an aromatic or aliphatic carboxylate, or an aromatic or aliphatic phosphorate. This configuration is preferred because the bending degree and the bending speed of the polymer actuator can be improved. As a method of exchanging the counter ions of the ion-conducting polymer compound, for example, the ion-conducting polymer compound may be impregnated with a solution of a salt containing ions for exchange. The solution may be an aqueous solution, an organic solvent, or a mixed solvent thereof.

It is preferred that a thickness of the ion-conducting layer be 10 µm or more to 500 µm or less. It is further preferred that the thickness of the ion-conducting layer be 10 µm or more to 400 µm or less. When the thickness is higher than 500 µm, the elastic modulus of the film may be so large that the bending motion of the actuator may be suppressed. When the thickness is lower than 10 µm, the amount of ionic material that can be held is small, and hence the amount of supply to the electrode layers is small. Therefore, sufficient bending motion may not be obtained.

The actuator according to the present invention may include a power supply unit that applies a voltage to the electrodes, and a control unit that controls the voltage.

The drive mechanism is basically derived from the migration of ions from the ion-conducting layer due to voltage application. However, the drive mechanism is slightly different between a case in which the ion-conducting layer is made of a nonionic polymer compound including an ion-conducting material and a case in which the ion-conducting layer is made of an ion-conducting polymer compound, which is roughly considered as follows.

That is, when the above-mentioned polymer compound is, for example, an ion-conducting polymer compound, the drive mechanism of the polymer actuator is considered as follows. For example, an example of a case in which an ion-conducting polymer compound is a polyanion in which an anionic functional group is introduced in a polymer is described. Cations that can be freely migrated within the actuator are migrated to a cathode side by application of a voltage, and water molecules contained within the actuator are also migrated to the cathode side together with the cations. Therefore, osmotic pressure on the cathode side increases to expand the membrane. On the contrary, it is difficult to attract anions which are fixed to the ion-conducting polymer compound to an anode side of an antipole. Therefore, the density of cations on the anode side decreases, and the osmotic pressure decreases to contract the membrane. As a result, the interior of the actuator is bent and deformed due to the expansion of the cathode side and the contraction of the anode side. When the polymer compound contains an ionic liquid which is described later, objects to be migrated are ions constituting the ionic liquid. In this case, the effect of the osmotic pressure is unknown, but the interior of the actuator which is made of the polymer compound is bent and deformed.

When the nonionic polymer compound is used, although the drive mechanism is unknown, a method is known in which a voltage is applied to a polymer membrane made of a nonionic polymer compound to which an ionic material such as sodium acetate is added, so as to bend and deform the polymer membrane. When the nonionic polymer compound contains the ionic liquid, anions constituting the ionic liquid are attracted to a positive electrode, and cations are attracted to a negative electrode by application of a voltage. The size of ions is different between anions and cations constituting the ionic liquid, and hence it is generally conceivable that a difference occurs in the curvature of a film due to the difference in the size of ions, and the film is bent and deformed.

(Electrode Layers)

In the actuator (ion-conducting actuator) according to the present invention, each of the electrode layers may be a flexible electrode made of complex of a conductive material and a polymer material (polymer binder), or a flexible electrode containing no polymer material such as an autonomous film, for example, obtained by packing CNT.

The conductive material is not particularly limited if the conductive material is an electronically conductive material that does not adversely affect the actuator performance. In general, the conductive material can include one or a mixture of conductive materials such as graphite, carbon black, acetylene black, Ketjen Black, carbon whisker (vapor-grown carbon), carbon (nanocarbon) fiber, activated carbon fiber, nanocarbon particles, metal (for example, platinum, palladium, ruthenium, silver, iron, cobalt, nickel, copper, molybdenum, indium, iridium, titanium, or aluminum, note that, the conductive material is not particularly limited to those materials) powder (fine particles), a metal compound (tin oxide, zinc oxide, indium oxide, stannic oxide, or ITO, note that, the conductive material is not particularly limited to those materials), metal fiber, and a conductive ceramic material. Among those materials, the nanocarbon material is preferred from the viewpoint of the conductivity and the specific surface area. Carbon nanotubes are particularly preferred. A CNT gel of carbon nanotube and an ionic liquid is advantageous in that the bundle of CNT is solved by self-organization with an ionic liquid, and CNT is effectively dispersed, and extremely suitable as the electrode material.

Carbon nanotubes are configured by cylindrically rolling up a sheet of graphite, and the cylinder diameter ranges from 1 nm to 10 nm. Carbon nanotubes used in the present invention are made of a carbon material shaped so that a graphite sheet is cylindrically rolled. Carbon nanotubes are roughly classified into single wall carbon nanotubes (SWCNT) and multi-wall carbon nanotubes (MWCNT) according to the number of components of its circumferential wall. Various carbon nanotubes are known. In the present invention, any type of the carbon nanotube may be used as long as it is named so-called carbon nanotube. Further, the SWCNT is classified into a metal property SWCNT and a semiconductor property SWCNT according to the arrangement of carbon atoms. Only the metal type SWCNT separated by the electrophoresis method or the like can be used.

The nanocarbon particle used in the present invention means particles of nanoscale ($10^{-6}$ to $10^{-9}$ m) mainly containing carbon such as a carbon nanohorn, amorphous carbon, and fullerene, other than the carbon nanotube. The carbon nanohorn means a carbon nanoparticle that is shaped so that a graphite sheet is conically rolled, and a tip is conically closed.

A carbon nanofiber used in the present invention is configured by cylindrically rolling up a sheet of graphite, and a cylinder diameter thereof ranges from 10 nm to 1,000 nm, which is also called "carbon nanofiber". The carbon nanofiber is a carbon fiber which is 75 nm or more in fiber diameter, and has a hollow structure and a large number of branch structures. As marketed products, there are VGCF and VGNF manufactured by Showa Denko K. K., and the like.

It is preferred that the additive amount of the conductive material in the electrode layers used in the present invention be 1 wt % or more with respect to the weight of the electrodes. When the additive amount of the conductive material is 1 wt % with respect to the weight of the electrodes, the electric conductivity that can function as the electrodes of the actuator can be provided, which is preferred. When the additive amount is lower than 1 wt %, sufficient conductivity of the electrode layers may not be obtained.

When each of the electrode layers includes polymer binders and the conductive material dispersed in the polymer binders, it is further preferred that the conductive material be uniformly dispersed. As a result, the potential is uniformly applied, which is preferred. In order to achieve this, the conductive material can be dispersed by processing of ball milling (ball mill, vibration ball mill, planetary ball mill, and the like), sand milling, colloid milling, jet milling, roller milling, a V mixer, an S mixer, a kneader, an agitator, a homogenizer, a colloid mill, a flow jet mixer, a dissolver, or an ultrasonic device. There can be used a disperser such as a vertical or horizontal agitator mill, an attriter, a collide mill, a ball mill, a three-roll mill, a pearl mill, a super mill, an impeller, a disperser, a KD mill, a dynatron, or a pressure kneader.

The thicknesses of the electrode layers are not particularly limited as long as the bending deformation of the actuator are not inhibited. It is preferred that the thicknesses of the respective electrode layers be 1 μm or more to 5 mm or less. It is further preferred that the thicknesses of the respective electrode layers be 5 μm or more to 2 mm or less. It is still further preferred that the thicknesses of the respective electrode layers be 10 μm or more to 500 μm or less. When the thicknesses of the respective electrode layers are lower than 1 μm, there may be a problem in terms of the electric conductivity as the electrodes of the actuator, which is not preferred. When the thicknesses of the electrode layers are higher than 5 mm, because the electrode layers contain the conductive material, the electrode layers get hard and become brittle to be easily broken. Further, the electrode layers may not be bent with the bending deformation of the actuator, which is not preferred.

The above-mentioned polymer binder constituting the electrode layer is not particularly limited as long as the polymer binder has such flexibility that the polymer binder can deform depending upon the bending deformation of the above-mentioned actuator. However, the polymer binder is preferred to be hydrolyzable to a small extent and stable in the atmosphere. Examples of such polymer binder include: polyolefin-based polymers such as polyethylene and polypropylene; polystyrene; polyimide; polyarylenes (aromatic polymers) such as poly(p-phenylene oxide), poly(2,6-dimethylphenylene oxide), and poly(p-phenylene sulfide); a polyolefin-based polymer, polystyrene, polyimide, and polyarylenes (aromatic polymers), in which a sulfonic acid group ($-SO_3H$), a carboxyl group ($-COOH$), a phosphoric acid group, a sulfonium group, an ammonium group, a pyridinium group, or the like has been introduced; fluorine-containing polymers such as polytetrafluoroethylene and polyvinylidene fluoride; a perfluorosulfonic acid polymer, a perfluorocarboxylic acid polymer, and a perfluorophosphoric acid polymer each having a fluorine-containing polymer skeleton, in which a sulfonic acid group, a carboxylic acid group, a phosphoric acid group, a sulfonium group, an ammonium group, a pyridinium group, or the like has been introduced; polybutadiene-based compounds; polyurethane-based compounds such as an elastomer and a gel; silicone-based compounds; polyvinyl chloride; polyethyleneterephthalate; nylon; and polyarylate. In addition, a polymer having an electric conductivity can also be used. Examples of such polymers include, but are not particularly limited to, polyaniline, polypyrrole, polythiophene, polyacetylene, and polyphenylene. It should be noted that any one of those polymers may be used alone, or multiple polymers may be used in combination. In addition, those polymers may be functionalized, or may be copolymerized with another polymer.

Of those polymer binders, particularly preferred polymers are a polyvinylidene fluoride-hexafluoropropylene copolymer (PVDF (HFP)), polyvinylidene fluoride (PVDF), perfluorosulfonic acid (Nafion), 2-hydroxyethyl methacrylate (HEMA), polymethyl methacrylate (PMMA), polyethylene oxide (PEO), and polyacrylonitrile (PAN). Further, it is preferred that the polymer binder be a polymer high in compatibility with the ion-conducting layer. As a result, because the polymer binder is higher in the compatibility and joining property with the ion-conducting layer, the more rigid electrodes can be configured. In order to achieve this, it is preferred that the polymer binder be a polymer having a polymer structure of the same type with, similar to, or identical with a polymer compound constituting the ion-conducting layer, or a polymer having a functional group of the same type with, similar to, or identical with a polymer compound constituting the ion-conducting layer.

Further, as the polymer binder, metal oxide having a polymer structure obtained through the sol-gel method can be also used. The metal oxide is not particularly limited. For example, metal oxides of manganese, nickel, cobalt, and vanadium pentoxide can be used.

As described above, the electrodes of the actuator according to the present invention is made of the polymer binders and the conductive material dispersed in the polymer binders to provide the conductivity. It is preferred that the resistance values of the electrodes to be used be equal to or lower than 1,000 Ω·cm. It is further preferred that the resistance be equal to or lower than 100 Ω·cm. When the resistance values of the electrodes are equal to or lower than 1,000 Ω·cm, the actuator according to the present invention can be bent by applying a low voltage to the electrodes. The electrodes may include components other than the polymer binder and the conductive material as long as the components do not adversely affect the function of the actuator.

(Insulating Layer)

The material of the insulating layer is not particularly limited, but known materials can be appropriately used, or can be used in combination as occasion demands. It is preferred that the specific volume resistivity of the insulating film be equal to or higher than 1,010 Ω·cm from the viewpoint of electric inertness. It is further preferred that the specific volume resistivity be equal to or higher than 1,015 Ω·cm. The insulating layer is not particularly limited as long as the electric insulation is obtained. It is desired that a rubber having flexibility or a polymer material be used. The rubber having flexibility or a polymer resin sheet follows the deformation drive of the actuator element to smoothly conduct deforming operation without giving a mechanical resistance. As a result, the higher output as the entire actuator can be surely achieved. Specific examples thereof include polyethylene (PE), polypropylene, diene-based rubbers such as a polybutadiene rubber, a natural rubber, a polyisoprene rubber, a styrene-butadiene copolymer rubber, a butyl acrylate-butadiene copolymer, and an acrylonitrile-butadiene copolymer, and hydrogenated products thereof, a natural rubber, a grafted natural rubber, natural trans-polyisoprene, a chloroprene rubber, block copolymer rubbers such as a styrene-butadiene-diene block copolymer rubber, an ethylene-propylene block copolymer, and a styrene-isoprene block copolymer, an ethylene-propylene-diene-based terpolymer, and hydrogenated products thereof, chloroprene, an urethane rubber, a polyether urethane rubber, a polyester urethane rubber, a nitrile rubber, a butyl rubber, a silicone rubber, a fluorocarbon rubber, a polyester-based rubber, an epichlorohydrin rubber, a silicone rubber, and an ethylene-propylene copolymer rubber. Of those, a silicone rubber is preferably used from the viewpoints of durability, formability, and electric property. In addition, the insulating layer may be formed of a combination of a plurality of those films, or may be formed of a composite material including an inorganic electrical insulating material.

A thickness of the insulating film in the present invention is not particularly limited. When the thickness is too thin, to obtain the membrane keeping the electric insulation tends to be difficult from the viewpoint of pinhole. When the thickness is too thick, an influence on the drive of the actuator becomes large. For that reason, the thickness is usually in a range of from 0.1 to 200 µm, and it is preferred that the thickness be in a range of from 1 to 150 µm, and it is further preferred that the thickness be in a range of from 10 to 100 µm.

(Drive of the Actuator)

The actuator according to the present invention can be deformed and driven by inducing the expansion and contraction of the different electrodes which are derived from the migration of ions by application of a voltage.

Figure 7A:
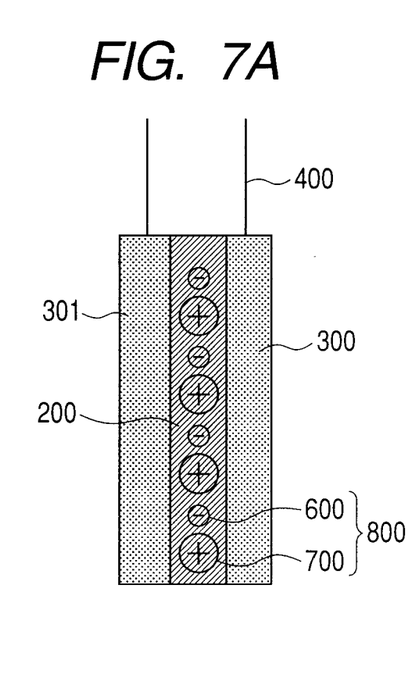
FIGS. 7A and 7B are explanatory diagrams illustrating the drive of the actuator according to the present invention.
Figure 7B:
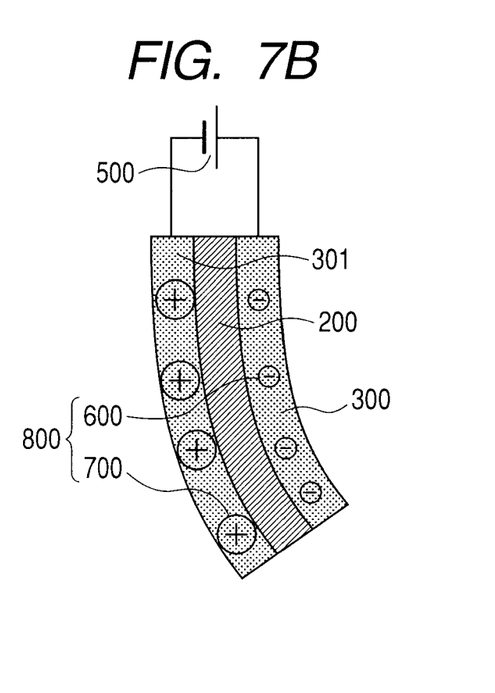

The actuator according to the present invention is deformed by migrating ions in the electrolyte by applying a voltage to the pair of electrodes. The drive principle during deformation of the actuator according to the present invention in which the electrolyte layer is arranged between the pair of electrodes is not clarified. The principle presumed at present is described with reference to FIGS. 7A and 7B with an element in which the electrolyte layer is arranged between two electrode layers as an example. As illustrated in FIG. 7A, two electrode layers 300 and 301 are formed on surfaces of an electrolyte layer 200 so as to be insulated from each other. When a potential difference is applied between the electrode layers 300 and 301, as illustrated in FIG. 7B, cations 700 and anions 600 of an electrolyte 800 operate so that the cations 700 migrate to and penetrate the electrode layer 301 of a cathode, and the anions 600 migrate to and penetrate the electrode layer 300 of an anode. Then, an electric double layer is formed on interfaces of the conductive materials within the electrode layers 300 and 301, and the ionic material layer. It is preferred that the ionic liquid with no vapor pressure be used as the electrolyte of the present invention from the viewpoint of the drive in air. In the ionic liquid, the ion radius of the cations 700 is larger than that of the anions 600. As a result, it is conceivable that the steric effect of ions existing within the electrode layers acts cooperatively with electrostatic repulsion accompanied by the electric double layer so that the electrode layer 301 is expanded more than the electrode layer 300, and the actuator is bent in a direction along which the cathode extends more than the anode. As usual, when the polarity of the potential is reversed, the membrane is bent and deformed in an opposite direction. The direction of displacement changes according to the configurations of the electrode layers and the electrolyte layer.

The actuator according to the present invention is deformed and driven when a low voltage of about 0.1 to 10 V is applied between the electrodes. It is further preferred that an applied voltage be 4 V or lower, taking a potential window of the ionic liquid into consideration. The drive system can use DC and AC by a desired drive. The direction of deformation, the amount of displacement, and the displacement speed are varied according to the type of the electrode layers and the ion-conducting layer, the composition and construction of the electrodes, and the type of ions to be migrated.

The bending deformation force for radially moving the respective strips of the actuator of the present invention can be adjusted by adjusting the applied voltage (electric energy). The actuator has a spiral structure, and hence the electric energy that has been applied to the actuator membrane which has been easily and simply integrated is efficiently converted into a dynamic energy, and reflected in the bending deformation motion in which the respective strips of the laminate are radially expanded or closed.

That is, when the actuator according to the present invention is used, the substantially equal force can be applied radially and from all directions by the actuation (deformation drive) of the strips. The object can be smoothly vertically moved in a direction of the cylinder of the actuator by using the actuation. Further, the object can be smoothly held and carried/released by the strips. In addition, the diameter of the tube can be smoothly expanded.

Example 1

Hereinafter, examples of the present invention are described with reference to the drawings. However, the present invention is not limited to those examples.

As illustrated in FIGS. 1 and 2, the actuator having a structure in which the laminate having the pair of electrode layers, the ion-conducting layer, and the insulating layer laminated on each other is spirally wound is described.

The actuator illustrated in FIG. 1 includes the laminate 5, the electrodes (not shown), and the fixing portion 10. The actuator conducts the bending deformation motion in a direction (or opposite direction thereof) along which a strip portion 7 in the notch region 9 which is formed by notching the actuator is radially warped toward the outside of the cylinder by application of the electric energy through the electrodes.

The strip portion 7 that is a drive portion is formed of the laminate including the two flexible electrode layers, the ion-conducting layer, and the insulating layer, and therefore excellent in elasticity.

Next, a method of manufacturing the actuator is described.

First, a laminate for fabricating the actuator is prepared. As illustrated in FIG. 2, the laminate 5 is a single ion-conducting actuator membrane (only a part of the actuator membrane is illustrated in FIG. 2). The laminate 5 is made up of the first electrode layer 1, the second electrode layer 2, the ion-conducting layer 3, and the insulating layer 4 that covers an exposed portion of the second electrode layer 2.

The ion-conducting layer 3 is an ion gel (polymer gel containing an ionic liquid) including 1-butyl-3-methylimidazolium tetrafluoroborate (BMIBF4), and a polyvinylidene fluoride-hexafluoropropylene copolymer (PVDF-HFP). Each of the electrode layers 1 and 2 is made of single wall CNT (SWCNT), BMIBF4, and PVDF-HFP. The insulating film is made of silicone rubber.

The membrane-shaped laminate 5 is cut along cut lines 60, 61, 62, . . . , except for an uncut portion 13 to form strip portions 70, 71, 72, . . . . The surface of the laminate 5 including the cut surfaces is subjected to insulation processing except for portions to which the electrodes are attached.

Then, the membrane-shaped laminate 5 is spirally wound around the conductive shaft made of a columnar metal material to form a multilayer structure. In this case, the upper and lower portions of the outer side and the inner side of the spirally wound membrane are put on each other so as to be aligned with each other.

It is preferred that the laminate 5 be spirally wound while being piled up so that the cut lines for each layer of the spiral winding of the multilayer structure match the cut lines for other layers. Here, "match" means not only a case of a complete match, but also a case where the cut lines are displaced to an implementable degree.

The cut lines of the outer side and the inner side of the spirally wound film are piled up so that the elongated regions of the strip portions for each layer of the spiral winding of the multilayer structure membrane in which the laminate 5 is spirally laminated match in a bending direction with each other. The actuator can be driven in a state in which those bending directions match each other. Silica gel fine particles are sprinkled on both surfaces of the laminate 5 in advance. Because the silica gel fine particles are sprinkled thereon, friction of portions of the elongated regions of the strip portions which contact each other is reduced, and the power efficiency of the actuator is enhanced.

Figure 4:
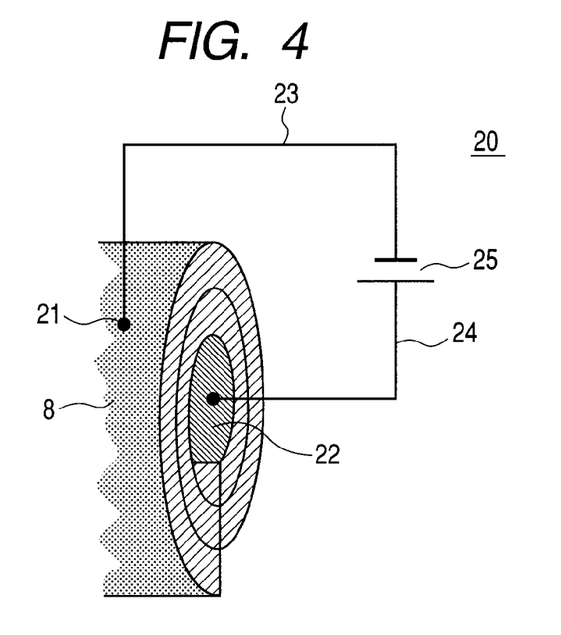
FIG. 4 is a schematic view illustrating a state in which electrodes are attached to a multilayer structure of an actuator according to Example 1 of the present invention.

Then, electrodes are attached onto the multilayer structure that is spirally wound. FIG. 4 is a schematic view illustrating a state in which electrodes are attached to the multilayer structure of the actuator in the present invention. An electrode 20 is made up of a terminal electrode 21 that is loaded on one electrode layer of the laminate of the multilayer structure 8, and a terminal electrode 22 that is attached to the other electrode layer of the laminate. The terminal electrode 21 is connected to an electric wire 23, and the electric wire 23 is connected to a negative electrode of a power supply 25. The terminal electrode 22 is connected to an electric wire 24, and the electric wire 24 is connected to a positive electrode of the power supply 25. A switch (not shown) is disposed on one of the electric wires 23 and 24 so as to turn on/off the application of a voltage to the actuator.

The actuator of the present invention changes over the switch so as to change a direction in which a voltage is applied to an opposite direction. As a result, the direction of the bending deformation drive can be changed to the opposite direction (warped toward the inside of the column or warped toward the outside of the column). Thus, the bending angle can be changed in a wide range. Further, the bending angle can be adjusted by changeover of the switch and output adjustment of the power supply.

The actuator fabricated in the above-mentioned procedure can be simply and easily formed with high integration, and obtains a substantially uniform developed force over all directions.

The laminate of the actuator is formed by laminating flexible films. When the electric energy supplied from the electrodes is large, the degree of bending deformation drive that the respective strip portions of the laminate are radially expanded or closed becomes large. When the degree of bending is large, the developed force of the actuator is large. For example, when an actuator having 50 strip portions is configured, the developed force obtained is about 50 times as large as the developed force obtained by an actuator having one strip portion of the same shape and form.

Example 2

Figure 5:
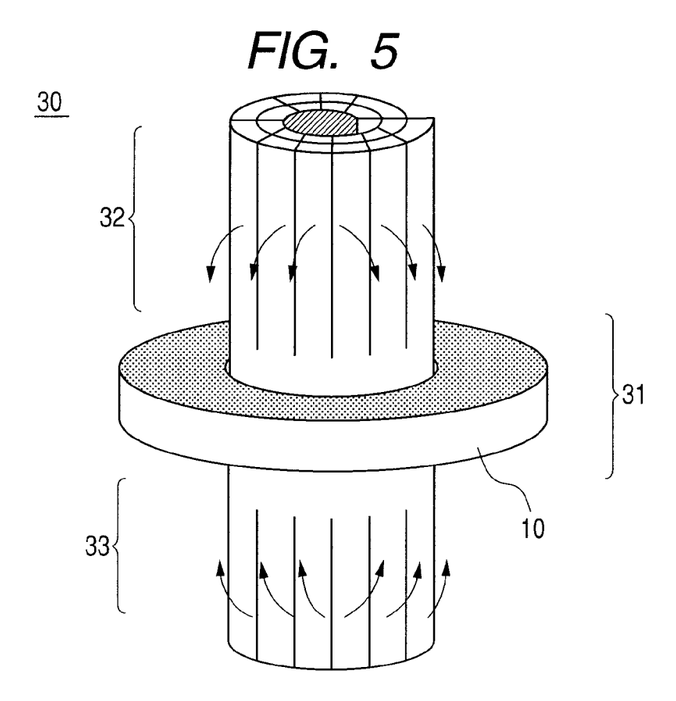
FIG. 5 is a schematic view illustrating an actuator according to Example 2 of the present invention.

This example shows that, in the actuator according to the above-mentioned Example 1, cut regions of the laminate are notched from two opposite directions to provide two cut regions, and the laminate is then spirally wound. FIG. 5 is a schematic view illustrating an actuator according to Example 2 of the present invention.

An actuator 30 has the fixing portion 10 on an uncut portion 31 in the center of the cylinder of the multilayer structure. Electrodes (not shown) are also attached to the uncut region in the center of the cylinder.

Similar to Example 1, in this actuator, the respective strip portions in the elongated region, which exist in notched regions 32 and 33 conduct the bending deformation motion so as to be radially expanded or closed by application of an electric field (FIG. 5 illustrates an image in which the upper and lower strip portions of the cylinder of the actuator 30 are radially expanded, by using arrows with no reference numeral).

For example, when an actuator having 50 strip portions at upper and lower sides of the cylinder is fabricated, the developed force obtained is about 100 times as large as the developed force obtained by an actuator having one strip portion of the same shape and form.

Example 3

Figure 6:
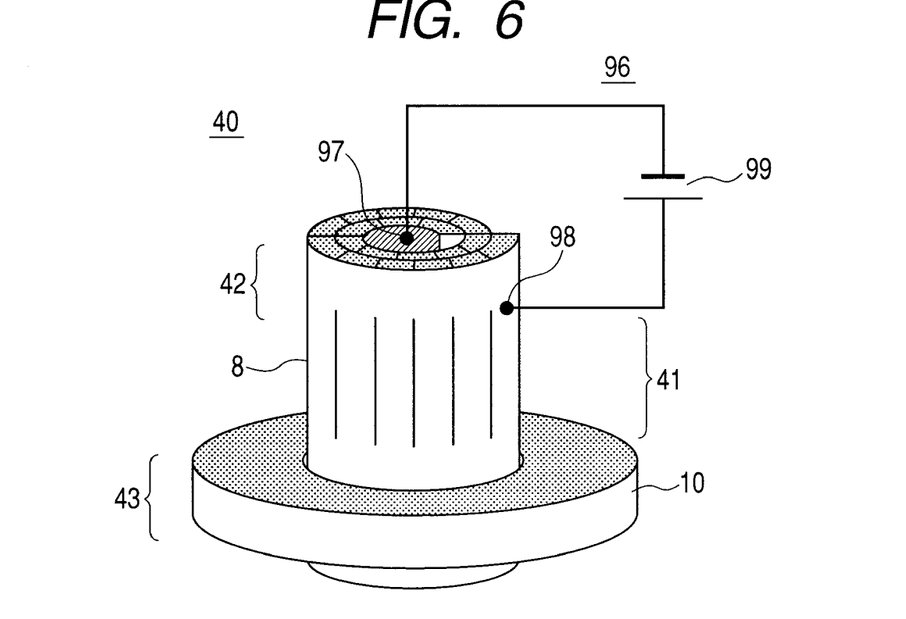
FIG. 6 is a schematic view illustrating an actuator according to Example 3 of the present invention.

This example shows that, in the actuator according to the above-mentioned Example 1, the laminate structured so that uncut portions are arranged on both ends thereof and a cut region is arranged in the center thereof, is spirally wound. FIG. 6 is a schematic view illustrating an actuator according to Example 3 of the present invention.

An actuator 40 according to this example includes a notched portion 41 having multiple cut lines in the center of the cylinder. The actuator 40 has uncut portions 42 and 43 at the upper and lower sides of the notched portion 41. The actuator 40 has the fixing portion 10 on the uncut portion 43 in the center of the cylinder.

An electrode 96 is attached to the spiral multilayer structure 8 in this example. The electrode 96 is made up of a terminal electrode 97 that is loaded on one electrode layer of the laminate of the multilayer structure 8, and a terminal electrode 98 that is attached onto the other electrode layer of the laminate. The terminal electrode 97 is connected to an electric wire, and the electric wire is connected to a negative electrode of a power supply 99. The terminal electrode 98 is connected to another electric wire, and the electric wire is connected to a positive electrode of the power supply 99. A switch (not shown) is disposed on one of the respective electric wires so as to turn on/off the application of a voltage to the actuator.

When the switch turns on the power supply, the electric energy is supplied to the actuator. In this situation, the actuator conducts the bending deformation motion by the strip portions of the notched region 41 formed by notching the actuator membrane.

The actuator changes over the switch so as to change a direction in which a voltage is applied to an opposite direction. As a result, the direction of the bending deformation drive can be changed to the opposite direction (bent toward the inside of the column). Thus, the bending angle can be changed in a wide range. The bending angle can be also adjusted by changeover of the switch and output adjustment of the power supply.

When the actuator having the notched portion in the center of the cylinder is used, the smooth and large developed force which cannot be obtained by the actuator of the same shape and form with no notched portion can be obtained.

Example 4

This example shows that, in the actuator according to the above-mentioned Example 1, the conductive shaft 91 does not reach the notched region portion 92. FIG. 8C is a schematic view illustrating an actuator 90 according to this example.

The actuator 90 according to this example has the notched region portion 92. Similar to Example 1, the spiral multilayer structure in this example includes the electrode and the terminal electrodes, which are connected to the power supply by wiring, so as to apply a voltage to the actuator (not shown). In addition, a fixing portion is provided in the uncut region portion 94 in the center of the cylinder (not shown).

When the switch turns on the power supply, a voltage is applied to the actuator. In this situation, the strip portions of the notched region portion 92 in the actuator conduct the bending deformation motion (for example, bent toward the outside of the column).

The actuator changes over the switch so as to change a direction in which a voltage is applied to an opposite direction. As a result, the direction of the bending deformation drive can be changed to the opposite direction (for example, bent toward the inside of the column). Thus, the bending angle can be changed in a wide range. Further, the bending angle can be also adjusted by changeover of the switch and output adjustment of the power supply.

When the actuator having the conductive shaft 91 in only the uncut region portion 94 is used, a problem that the conductive shaft interrupts the vertical drive, as in the actuator illustrated in FIG. 8A, does not arise. As a result, the rectangular object can be vertically driven by the smooth and large developed force.

The actuator according to the present invention is suitable for an actuator of a robot that treats a person, which requires flexibility and safety (for example, an actuator of a personal robot such as a home robot, a pet robot, or an amusement robot, in this example, including a retaining and carrying mechanism and an object moving mechanism), and a drive source of various machines as well as an actuator for a medical and welfare robot such as an operation device or a muscle suit, and an actuator for a micromachine.

Example 5

This example shows that, in the actuator of the present invention, a part of the circumference of the actuator is bound by a binding band having an electric conductivity.

Unless otherwise indicated, the laminate of this example is formed by winding the other electrode layer, on which no insulating layer is disposed, in contact with the conductive shaft, and at least a part of the exposed portion of the electrode layer, in which a part of the insulating layer on the circumferential portion of the laminate in contact with the binding band having the electric conductivity is removed, is electrically connected to the binding band having the electric conductivity.

FIG. 9A is a schematic view illustrating an actuator 100 according to this example with one binding band having the electric conductivity. The actuator 100 has a notched region portion 101 and a conductive shaft 102. Further, wiring connection is made from a power supply 104 through wirings 106 and 105 to the conductive shaft 102 and a binding band 103, respectively, so as to apply a voltage to the actuator.

FIG. 9B is a schematic view illustrating an actuator 107 according to this example with two binding bands having the electric conductivity. The actuator 107 has notched region portions 108, 109, and 111 and a conductive shaft 110. Further, wiring connection is made from a power supply 114 through wirings 115 and 116 to the conductive shaft 110 and binding bands 112 and 113, respectively, so as to apply a voltage to the actuator.

FIG. 9C is a schematic view illustrating an actuator 117 according to this example with two binding bands having the electric conductivity, in which a cut region portion extends from one end to the other of the actuator. The actuator 117 has a notched region portion 120 and conductive shafts 118 and 122 at both ends of the actuator. Further, wiring connection is made from a power supply 124 through wirings 123 and 125 to the conductive shafts 118 and 122 and binding bands 119 and 112, respectively, so as to apply a voltage to the actuator.

Also in the actuator according to this example, when the switch turns on the power supply, a voltage is applied to the actuator. In this situation, the strip portions of the notched region portion in the actuator conduct the bending deformation motion (for example, bent toward the outside of the column).

The actuator changes over the switch so as to change a direction in which a voltage is applied to an opposite direction. As a result, the direction of the bending deformation drive can be changed to the opposite direction (for example, bent toward the inside of the column). Thus, the bending angle can be changed in a wide range. Further, the bending angle can be also adjusted by changeover of the switch and output adjustment of the power supply.

The actuator according to this example is bound by the binding band having the electric conductivity around a part of the circumference. Thus, the shape of the actuator of the present invention may be retained without using a separate fixing unit, and wiring connection can be made easily from the external power supply (power supply) through the binding band. Further, the bending drive portion of the actuator according to this example is bound by the binding band. Thus, the amount of displacement in the direction perpendicular to the conductive shaft and the amount of displacement in the conductive shaft direction may be reduced, and at the same time, large developed force of the expansion and contraction may be obtained by the actuator.

As a result, it is possible to easily manufacture an actuator that simply allows appropriate control of the amount of bending displacement and the developed force.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-221105, filed Sep. 25, 2009, and 2010-174841, filed Aug. 3, 2010, which are hereby incorporated by reference herein in their entirety.

What is claimed is:

1. An actuator comprising a laminate, the laminate comprising:
    a pair of electrode layers;
    an ion-conducting layer that is held between the pair of electrode layers; and
    an insulating layer that is disposed on one of the pair of electrode layers, wherein the laminate forms a multilayer structure that is spirally wound around a conductive shaft, and multiple notches are formed in at least a partial region of the multilayer structure.

2. The actuator according to claim 1, wherein a direction of the multiple notches formed by notching the laminate is not perpendicular to an axial direction of the conductive shaft.

3. The actuator according to claim 1, wherein the laminate that forms the multilayer structure is wound so that another one of the pair of electrode layers, on which no insulating layer is disposed, contacts the conductive shaft.

4. The actuator according to claim 1, wherein a direction of the multiple notches is parallel to an axial direction of the conductive shaft.

5. The actuator according to claim 1, wherein lengths of the multiple notches are identical with each other, and intervals between the multiple notches are identical with each other.

6. The actuator according to claim 1, wherein the ion-conducting layer contains an ionic liquid.

7. The actuator according to claim 1, wherein a cut end of the laminate, which is cut off by a plane including a cross section closest to the multiple notches among cross sections of the conductive shaft that are perpendicular to the axial direction of the conductive shaft, does not cross the multiple notches.

8. The actuator according to any one of claims 1 to 6 and 7, wherein at least a part of a circumferential portion of the laminate is bound by a binding band having an electric conductivity, at least a part of the insulating layer on the circumferential portion of the laminate has a portion in which no insulating layer is formed, and the electrode layer in contact with the insulating layer of the laminate is electrically connected to the binding band through the portion in which no insulating layer is formed.

9. A method of manufacturing an actuator, comprising:
preparing a laminate including a pair of electrode layers, an ion-conducting layer that is held between the pair of electrode layers, and an insulating layer that is disposed on one of the pair of electrode layers;
forming multiple notches in a partial region of the laminate; and
spirally winding the laminate around a conductive shaft so that a direction of the multiple notches is parallel to an axial direction of the conductive shaft to form a multilayer structure.

10. The method of manufacturing an actuator according to claim 9, wherein the laminate is wound so that another one of the pair of electrode layers, on which no insulating layer is disposed, contacts the conductive shaft.

* * * * *